June 22, 1954  B. E. HALL  2,681,545
ORNAMENTAL BEAD CHAIN
Filed Dec. 26, 1952
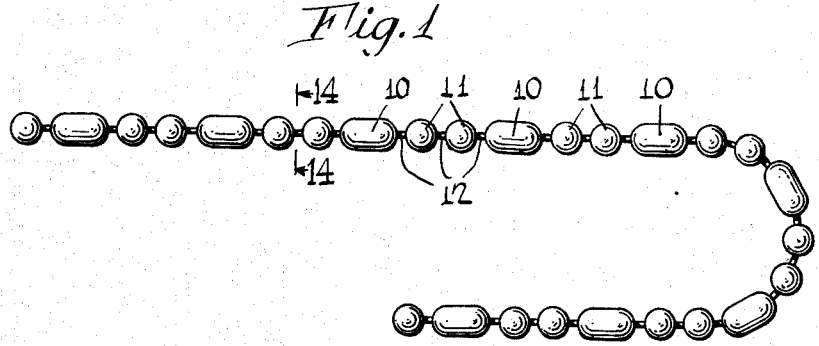
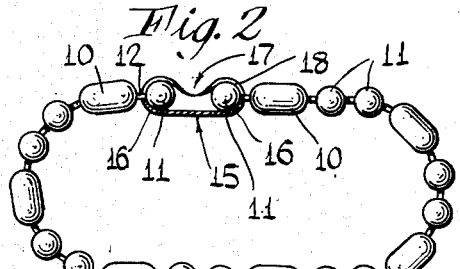
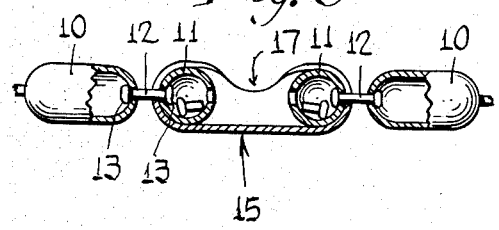
INVENTOR
*Bartley E. Hall*
BY *Johnson and Kline*
ATTORNEYS Patented June 22, 1954

2,681,545

UNITED STATES PATENT OFFICE 2,681,545

ORNAMENTAL BEAD CHAIN

Bartley E. Hall, Monroe, Conn., assignor, by mesne assignments, to Bead Chain Manufacturing Company, Bridgeport, Conn., a corporation of Connecticut Application December 26, 1952, Serial No. 328,085

2 Claims. (Cl. 59—2)

The present invention relates to an ornamental bead chain.

Heretofore in providing an ornamental bead chain it was proposed to have the chain composed of alternate spherical and elongate beads. The difficulty with such construction is that when the chain was intended to have its ends connected by the usual snap connector it was necessary to remove an elongate bead in order that the spherical beads may be available for use with the connector.

The present invention overcomes this difficulty without detracting from the ornamental appearance of the chain by providing an ornamental chain in continuous lengths formed of spherical and elongate beads arranged with a plurality of spherical beads between each elongate bead. With this construction, when it is desired to make a connection with the usual snap connector, it is merely necessary to sever the chain between the spherical beads.

A feature of the present construction is that it produces a substantial economy of material in the manufacture of connected chain in that it eliminates the waste of an elongate bead in order to provide for each connection.

A further feature resides in the elimination of the second cut in the severing operation which is normally required to disconnect both ends of the elongate bead since a single cut between the spherical beads is all that is required.

Other features and advantages of the invention will be apparent from the specification and claims when considered in connection with the drawings in which:

Figure 1 shows a section of the ornamental chain of the present invention.

Fig. 2 shows a section of the chain with the ends connected.

Fig. 3 shows a detailed sectional view of the chain.

As shown in Fig. 1 the chain comprises elongate beads 10 separated by spherical beads 11. While two or more spherical beads may be used to separate the elongate beads in accordance with the present invention, in the herein illustrated form of the invention a pair of said spherical beads is shown.

As is shown in Fig. 3 the elongate beads 10 and spherical beads 11 are preferably hollow and are connected by separate connecting members 12. The connecting members 12 as herein disclosed have enlarged ends 13 confined within the beads. Such a chain may be formed by known multiple swaging methods.

When it is desired to form a connection with the chain, it is merely necessary to sever the chain by cutting the connecting member between the pair of beads, for example along the line 14, 14 of Fig. 1, thus automatically providing a spherical bead at the adjacent ends of the chain. The ends of the severed connecting member 12 usually fall into the interior of the bead and provide a smooth spherical end on the chain which may be slipped into the usual snap connector 15 having a socket 16 at each end and an opening 17 in one side intermediate the ends thereof through which the sphere may be inserted and snapped into socket 16 with slots 18 being provided through which the connecting members may be moved as shown in Fig. 2.

Thus it will be seen that I have provided an improved ornamental chain which, without detracting from its ornamental appearance, produces a number of advantages over ornamental chain heretofore used since it is no longer necessary to remove an elongate bead in order to provide spherical beads for connecting the ends, thus eliminating loss of material of the elongate bead for each connection. Also, it reduces the number of operations involved in making bead chains since it eliminates the second cut necessary to remove the elongate beads. These advantages result in substantial savings when the large volume of chain which is used and the connections to be made thereon is considered.

Variations and modifications may be made within the scope of the claims and portions of the improvements may be used without others.

I claim:

1. In an ornamental bead chain having elongate beads separated by short beads, said beads being connected by connectors and said chain being adapted to have the ends thereof connected by a joining clip having resilient sockets in the ends thereof into which the short beads may be snapped, the elongate beads being of a dimension which cannot be snapped into said clip, the improvement wherein at least two short beads are disposed between each pair of elongate beads and said short beads are connected by one of said connectors, which is severable, whereby when said one connector is severed between said short beads the chain is automatically provided, without waste of a chain link, with short beads at each of the severed ends thereof to be snapped into said clip.

2. In an ornamental bead chain having elongate hollow beads separated by hollow spherical beads, said beads being connected by connecting members having enlarged heads at each end disposed within the beads and said chain being adapted to have the ends thereof connected by a joining clip having resilient sockets in the ends thereof into which the spherical beads may be snapped, the elongate beads being of a dimension which cannot be snapped into said clip, the improvement wherein at least two spherical beads are disposed between each pair of elongate beads and said spherical beads are connected by one of said connectors, which is severable, whereby when said one connector is severed between said spherical beads the chain is automatically provided, without waste of a chain link, with spherical beads at each of the severed ends thereof to be snapped into said clip.

References Cited in the file of this patent

UNITED STATES PATENTS

| Number | Name | Date |
|---|---|---|
| 61,777 | Wallace | Feb. 5, 1867 |
| 1,103,760 | Goodridge | July 14, 1914 |
| 1,840,681 | Seidman et al. | Jan. 12, 1932 |
| 2,298,591 | Ross | Oct. 13, 1942 |
| 2,540,369 | Hume | Feb. 6, 1951 |
| 2,591,335 | Blouin | Apr. 1, 1952 |

OTHER REFERENCES

1952 Catalog of The Bead Chain Manufacturing Co., Mountain Grove and State Sts., Bridgeport, Conn.